United States Patent [19]

Wilson

[11] 4,379,873
[45] Apr. 12, 1983

[54] PROCESS FOR SETTING A LATEX OF A FILM FORMING POLYMER

[75] Inventor: Douglas Wilson, Weybridge, England

[73] Assignee: The British Petroleum Company Limited, London, England

[21] Appl. No.: 286,189

[22] Filed: Jul. 23, 1981

[30] Foreign Application Priority Data

Aug. 1, 1980 [GB] United Kingdom ............... 8025260

[51] Int. Cl.$^3$ .............................................. C08K 3/34
[52] U.S. Cl. ...................................... 524/7; 524/423; 524/435
[58] Field of Search ................ 260/28.5 B, 5, 29.7 R; 524/7, 8, 423, 435

[56] References Cited

U.S. PATENT DOCUMENTS 3,245,453  4/1966  Barton et al. ...................... 152/330
4,060,425  11/1977 Harada et al. ...................... 106/90

FOREIGN PATENT DOCUMENTS 22624  1/1981  European Pat. Off.
2363085  12/1972  Fed. Rep. of Germany.

OTHER PUBLICATIONS

D. C. Blackley, "High Polymer Latices," vol. 1, 1966, pp. 26-30 and 44-51.

*Primary Examiner*—Joseph L. Schofer
*Assistant Examiner*—Bernard Lipman
*Attorney, Agent, or Firm*—Brooks, Haidt, Haffner & Delahunty

[57] ABSTRACT

Delayed action setting of a composition comprising an amonic latex of a film forming polymer is effected by the addition of a delayed action setting agent which is a mixture of:

(1) a compound containing a multivalent metal cation, which compound has a solubility in the range 0.1 g to 150 g per 100 g of water at 20° C and which has a dissolution time greater than 1 minute, and

(11) and alkali metal silico fluoride

Other film forming materials such as bitumen may be present in the composition. The process is particularly useful for mixtures of polychloroprene latex and bitumen emulsion. The compound (1) can be either one which gives or one which does not give exudation (or 'sweating') of water from the latex. A preferred compound of the former type is calcium sulphate hemihydrate. The preferred fluoride (11) is sodium silico fluoride. The composition may also contain inert non-hydraulic particulate filler which can be a hard filler, e.g. sand or a deformable filler, e.g. tire crumbs, or a mixture of the two.

1 Claim, No Drawings

PROCESS FOR SETTING A LATEX OF A FILM FORMING POLYMER

The present invention relates to the setting of ionic latices of film forming polymers. It is sometimes desirable to add substances to latices of film forming polymers, which substances will cause the latex to gel or coagulate to a solid or semi-solid after a certain time has passed, so enabling the latex to be subjected to various processing steps before gelling or coagulation takes place. It is known to use sodium silico fluoride as a delayed action setting agent for rubber latices, for example in the preparation of ground coverings, e.g. for sports tracks and playgrounds.

Our European Application No. 0022642 (Case 4796) discloses the delayed action setting of a composition comprising an ionic latex of a film forming polymer in which the setting agent is a compound containing a multivalent metal cation with defined solubility characteristics, and used in a defined quantity.

We have now found that mixtures of alkali metal silico fluorides and the above-mentioned metal cation compounds show a synergistic effect in delayed action setting of latices.

According to the present invention, there is provided a process for the delayed action setting of a composition comprising an anionic latex of a film forming polymer by the addition of a delayed action setting agent characterised in that the setting agent is a mixture of (1) a compound containing a multivalent metal cation, which metal cation compound has a solubility in the range 0.1 g to 150 g per 100 g of water at 20° C. in water and which has a dissolution time greater than 1 minute, and (2) an alkali metal silico fluoride.

By "setting" throughout the specification is meant not the final hardening or curing reaction which may finally take place, but the initial transformation of the latex to a solid material.

The latices to which the present invention may be applied are latices of film polymers, i.e. polymers which when a layer of the latex is deposited on a surface form a coherent film when water is evaporated at ambient temperatures. Examples of latices which may be used are latices of natural and synthetic rubbers. Specific examples of synthetic rubbers which may be used are polychloroprene, acrylonitrile-butadiene (nitrile) rubber, and styrene-butadiene rubber. Mixtures of latices of different rubbers can be used. It is particularly preferred that polychloroprene latex forms the major part (at least 50%) of any latex of film forming polymer used. More preferably polychloroprene is substantially the only rubber (natural or synthetic) present in the composition. It has been found that with compositions based on polychloroprene, a suitable choice of multivalent cation can cause exudation or sweating of water from the gelled composition so facilitating rapid drying.

Mixtures of film forming polymers may be present in the latex. In addition, the composition to be set may contain other film forming materials. Thus it may contain an emulsion of bitumen which is not normally regarded as a true polymer. The process of the present invention is particularly useful for mixtures of polychloroprene latex and bitumen emulsion which may be used, for example, in the preparation of ground coverings.

The concentration of film forming polymer in the latex used to prepare the composition of the present invention may vary over a moderately wide range, for example, from 20% to 70% by weight of the latex, but is preferably 45% to 64% based on the total weight of the latex. The same ranges apply also to emulsions of other film forming materials, e.g. bitumen, which may be incorporated in the composition.

Where a film forming material other than the film forming polymer, e.g. bitumen, is present in the composition the weight ratio of the additional film forming material, e.g. bitumen, to film forming polymer is preferably in the range 8:1 to 1:8, more preferably 2:1 to 1:2.

The process of the invention is applied to an anionic latex. The nature of the anionic surfactant used in the preparation of the latex is not believed to be critical and may, for example, be an alkali metal or ammonium salt of an alkyl sulphuric acid, and alkaryl sulpnonate, or of a long chain fatty acid, or a soap derived from a resin acid. Specific examples of anionic surfactants which may be used in the preparation of the latex are sodium dodecyl sulphate, sodium laurate.

The composition preferably contains an inert non-hydraulic particulate filler. The filler in non-hydraulic as otherwise the filler would take up water from the composition and cause premature setting. It is inert in that it does not release multivalent metal ions into the composition, i.e. it will not itself cause the composition to set. The filler may be a hard filler, e.g. sand, slate dust, or certain types of clay, e.g. Devolite clays ex-English China Clays Limited, or a deformable filler, e.g. tire crumbs obtained by milling used rubber tires.

The hard filler may, for example, have a mesh size in the range 200–50 British Standard mesh. The deformable filler may, for example, have a particulate size in the range 60–10 British Standard mesh.

Mixture of different types of filler may be used. It is preferred to use a ratio of deformable filler, e.g. tire crumbs, and hard filler, e.g. sand, in the range 10:1 to 1:10, more preferably 3:2 to 2:3.

The total filler content is preferably 15% to 85% of the total composition. The composition preferably does not contain more than 75%, more preferably not more than 60% by weight of the filler. The composition preferably does not contain less than 25%, more preferably not less than 30% by weight of filler. Very low levels of filler give a product which is expensive and is less suitable as a playground surfacing material because of excessive resilience.

The metal cation compound must be a compound with a low solubility in water, i.e. it has a solubility of 0.1 g to 150 g per 100 g of water at 20° C., preferably 0.2 g to 50 g per 100 g of water, more preferably 0.2 g to 20 g per 100 g of water.

The metal cation compound must not have a high dissolution rate. The dissolution time is not less than 1 minute and is determined by measuring the time taken for 1 g of the compound (of particle size 150–300 micron) to dissolve in 100 g of $H_2O$ at 20° C. without stirring. The dissolution time is preferably over 2 minutes and most preferably over 5 minutes. If the solubility of the compound is less than 1 g per 100 g of water at 20° C., the dissolution time will, of course, be infinite.

The use of certain multivalent metal compounds results in the exudation of water from the gelled composition thus facilitating rapid drying.

Examples of multivalent cation compounds which can be used but which do not give exudation (or 'sweating') of water from the latex on setting are cupric acetate, lead chloride, magnesium acetate, barium hydroxide, cadmium sulphate, cobaltous acetate, zinc sulphate, ferrous sulphate, calcium hydroxide, and calcium formate.

Examples of multivalent cation compounds which can be used which cause exudation (or 'sweating') of water from polychloroprene latex on setting are aluminium acetate, barium nitrate, cupric sulphate, lead acetate, calcium sulphate, calcium sulphate dihydrate, and calcium sulphate hemihydrate (plaster of Paris). The use of calcium sulphate hemihydrate is preferred.

The preferred alkali metal silico fluoride is sodium silico fluoride.

The total quantity of delayed action setting agent mixture is preferably in the range 0.25 to 2% by weight based on the total weight of composition, more preferably 0.5% to 1% by weight. The weight ratio of multivalent cation compound to alkali metal silico fluoride is preferably in the range 30:1 to 1:30, more preferably 10:1 to 1:10, most preferably 5:1 to 1:5.

The synergistic blends of the presnet invention make possible a considerable reduction in the quantity of delayed action setting agent required to give a given gel time, i.e. the time before setting takes place. They also enable compositions to be obtained which have wet gel strengths considerably greater than those obtained using either component alone. Wet gel strength represents the strength after initial setting but before the final drying out of the composition and is important for determining the resistance of the composition to damage, including intentional damage, in the period immediately after setting. Furthermore the use of certain multivalent metal cation compounds in the mixture of delayed action setting agents of the present invention enables compositions to be produced which show water exudation on settiny, i.e. which produce a surface layer of water on the surface of the material as a result of the setting process. This leads to an increase in the drying rate where there is adequate ventilation (e.g. in the open air) and thus to a more rapid development of mechanical strength. An additional advantage is that it possible to obtain short setting times without obtaining compositions which are excessively viscous. If for example plaster of Paris or sodium silico fluoride are used alone then the quantities required for short setting time will be such that the composition will become excessively viscous. As in the process of the present invention smaller amounts of coagulant are required for a given gel time, the viscosity of the liquid composition is lower.

A further advantage of this system is that the setting time can be kept relatively constant at different temperatures by varying the amount of coagulant.

It is possible therefore to cause the setting of the composition at low temperatures with the appropriate choice of the quantity of setting agent.

This in turn means that the laying season can be increased compared to conventional polyurethane type systems which can only be laid conveniently at higher temperatures.

The invention will now be illustrated by reference to the following Examples.

A composition (identified as Composition C1) was formed from the following ingredients:

| | % by weight |
|---|---|
| Anionic polychloroprene latex (solids content 60%) | 29.6 |
| Anionic Bitumen emulsions (solids content 60%) | 15.2 |
| Zinc oxide dispersion (50% wt/wt) in water | 1.7 |
| Tire Crumb (16–20 mesh) | 20.5 |
| Sand (200 mesh) | } to 100% |
| Coagulant | |

The composition was prepared by stirring together the polychloroprene latex, the bitumen emulsion and zinc oxide and then adding a mixture of sand, tire crumb, and coagulant to the stirred mixture.

A series of experiments was carried out (Examples 1 to 27 and Comparative Tests A to I) using Composition C1 and varying the nature and amounts of the coagulant. The compositions were spread on surfaces and the gel times were determined by continual inspection of the compositions. The gel time is the time taken after the composition has been mixed and spread on a surface for the composition to change from a viscous slurry to a solid.

For some of the compositions the hardening times were also determined. The hardening time is the time after the composition has been mixed and spread on a surface at which the composition can withstand the effect of being walked on without any permanent deformation.

Comparative Test A

This is a comparative test not according to the invention.

The coagulant used was 1% wt of calcium sulphate hemihydrate (plaster of Paris). The gel time is given in Table 1.

Comparative Test B

This is a comparative test not according to the invention.

The coagulant used was 1.0% wt of sodium silico fluoride. The gel time is given in Table I.

EXAMPLE 1

The coagulant used was a mixture of 0.25% wt plaster of Paris and 0.15% wt sodium silico fluoride giving a total of 0.4% wt of coagulant. The gel time is given in Table 1. This clearly shows that much less of the coagulant mixture is required than of the individual components for an equivalent gel time.

TABLE 1

| Experiment | POP | SSF | Gel Time (minutes) |
|---|---|---|---|
| A | 1.0 | — | 21 |
| B | — | 1.0 | 26 |
| 1 | 0.25 | 0.15 | 25 |

POP = Plaster of Paris
SSF = Sodium silico fluoride

EXAMPLES 2 TO 6

These examples illustrate the effect of using various amounts of a coagulant blend of constant composition. The coagulant blend contained plaster of Paris and sodium silico fluoride in a 1:1 weight ratio. The gel times obtained are given in Table 2.

TABLE 2

| Experiment | Coagulant Mixture (% wt) | Gel Time (minutes) |
|---|---|---|
| 2 | 0.25 | 50 |
| 3 | 0.5 | 14 |
| 4 | 0.75 | 7 |
| 5 | 1.0 | 5 |

TABLE 2-continued

| Experiment | Coagulant Mixture (% wt) | Gel Time (minutes) |
|---|---|---|
| 6 | 2.0 | 0.5 |

Comparative Tests C and D

These are comparative tests not according to the invention, using 0.5% wt of plaster of Paris (C) and sodium silico fluoride (D). The gel times are shown in Table 3.

EXAMPLES 7 TO 11

These examples show the effect of varying the weight ratio of plaster of Paris and sodium silico fluoride using substantially the same amounts of total coagulant as used in Comparative Tests C and D.

TABLE 3

| | Coagulant % wt | | | |
|---|---|---|---|---|
| Experiment | POP | SFF | Total | Gel Time (minutes) |
| C | 0.5 | — | 0.5 | 60 |
| D | — | 0.5 | 0.5 | 40 |
| 7 | 0.375 | 0.1 | 0.475 | 41 |
| 8 | 0.05 | 0.5 | 0.55 | 23 |
| 9 | 0.1 | 0.375 | 0.475 | 20 |
| 10 | 0.25 | 0.25 | 0.5 | 14 |
| 11 | 0.5 | 0.05 | 0.55 | 10 |

Comparative Tests E and F

These are comparative tests not according to the invention. They were carried out as Tests A and B respectively but using 2% weight of plaster of Paris and sodium silico fluoride respectively instead of 1%. The gel times are given in Table 4. For comparison the results from Tests A and B are also given in Table 4.

EXAMPLES 12 TO 15

These examples show the effect of adding small quantities of sodium silico fluoride to a fixed quantity of plaster of Paris and vice versa. The synergistic effect on gel time is clearly disclosed. The gel times are given in Table 4.

TABLE 4

| | Coagulant (% wt) | | |
|---|---|---|---|
| Experiment | POP | SFF | Gel Time (minutes) |
| A | 1 | — | 21 |
| 12 | 1 | 0.05 | 5 |
| 13 | 1 | 0.25 | 2 |
| E | 2 | — | 3 |
| B | — | 1 | 26 |
| 14 | 0.05 | 1 | 13 |
| 15 | 0.25 | 1 | 7 |
| F | — | 2 | 17 |

The hardening times for these experiments in which hardening time was determined are set out in Table 5.

TABLE 5

| Experiment | Gel Time (minutes) | Hardening Time (minutes) |
|---|---|---|
| A | 21 | 90 |
| B | 26 | 60 |
| 1 | 25 | 36 |
| E | 3 | 30 |
| 13 | 2 | 20 |

Example 1 is noteworthy as showing that for a gel time comparable with the comparative tests A and B the hardening time is greatly reduced.

Comparative Test G

This is a comparative test not according to the invention.

A composition was prepared as in Test E with 2% wt plaster of Paris as coagulant and was spread on a surface which was subjected to a gentle current of cold air. The percentage of total water originally present in the composition which remained after 4 hours was determined. The results are given in Table 6.

EXAMPLE 16

An experiment was carried out as in Test C but using the composition of Example 6. The results are given in Table 6.

TABLE 6

| | (wt %) Coagulant | | wt % of available water removed after 4 hours |
|---|---|---|---|
| Experiment | POP | SFF | |
| G | 2 | 1 | 26% |
| 16 | 1 | 1 | 37% |

The quicker drying under conditions of good ventilation shown by the compositions of the present invention results from the phenomenon of water exudation observed in the above examples. This phenomenon was not observed in the comparative tests using plaster of Paris or sodium silico fluoride alone.

All the experiments described above were carried out at normal ambient temperature (20° C.). The experiments described below demonstrate the beneficial effects of the present invention at low temperatures.

EXAMPLES 17 TO 19

These examples show the effect of varying the composition of the coagulating agent and the quantity used so as to obtain similar setting times at different temperatures. The results are shown in Table 7.

TABLE 7

| | Temperature | Coagulant (wt %) | | Gel Time |
|---|---|---|---|---|
| Experiment | (°C.) | POP | SFF | (minutes) |
| 17 | 20 | 0.25 | 0.15 | 25 |
| 18 | 10 | 1.2 | 0.3 | 20 |
| 19 | 5 | 1.2 | 1.0 | 24 |

Comparative Tests H and I

These are comparative tests not according to the invention. Experiments were carried out at ambient temperatures (20° C.) as in the previous experiments but using as sole setting agent sodium silico fluoride (SFF) at concentrations of 0.5 and 1.0 wt % respectively. The results are shown in Table 8.

EXAMPLES 20 TO 27

Experiments were carried out as in Comparative Test H but in the additional presence of various metal salts having multivalent cations.

The results are shown in Table 8.

TABLE 8

| (i) | (ii) | (iii) | (iv) | (v) | (vi) | (vii) |
|---|---|---|---|---|---|---|
| H | 0.5 | — | — | 40 | No | — |
| 20 | 0.5 | Cupric acetate | 0.5 | 5 | No | 15 |
| 21 | 0.5 | Aluminium acetate | 1.0 | 22 | Yes | 50 |
| 22 | 0.5 | Barium nitrate | 0.75 | 6 | Yes | 15 |
| 23 | 0.5 | Ferrous sulphate | 0.5 | 1 | No | 5 |
| 24 | 0.5 | Cupric sulphate | 0.5 | 3 | Yes | 15 |
| 25 | 0.5 | Magnesium acetate | 0.13 | 3 | No | 15 |
| 25 | 0.5 | Lead acetate | 0.75 | 10 | Yes | 25 |

TABLE 8-continued

| (i) | (ii) | (iii) | (iv) | (v) | (vi) | (vii) |
|---|---|---|---|---|---|---|
| 27 | 0.5 | Magnesium carbonate | 1.0 | 13 | No | >16 hours |
| I | 1.0 | — | — | 26 | No | |

(i) Experiment
(ii) SFF wt %
(iii) Salt
(iv) Amount salt wt %
(v) Gel Time mins
(vi) Exudation of water (sweating)
(vii) Gell time with no SFF present (minutes)

The following Examples 28 and 29 show the effect of replacing all or part of the polychloroprene latex by another rubber latex.

Experiments were carried out using two different compositions, identified as compositions C2 and C3.

Composition C2

Composition C2 was prepared in the same way as Composition C1 except that 30% by weight of the polychloroprene latex was replaced by a SBR latex (strene-butadiene rubber) sold as Intex 168 by The International Synthetic Rubber Compnay Limited.

Comparative Tests J and K

These are comparative tests not according to the invention. The composition was prepared from Composition C2 using plaster of Paris (POP) and sodium silico fluoride (SFF) respectively as the sole coagulant, and tested as in the previous examples. The results obtained are given in Table 9.

EXAMPLE 28

An experiment was carried out as in Tests J and K but using a combination of plaster of Paris and sodium silico fluoride. The results are given in Table 9.

TABLE 9

| Experiment | POP % wt | SSF % wt | Gel time (minutes) | Exudation of water (sweating) |
|---|---|---|---|---|
| J | 1 | — | more than 75 | No |
| K | — | 0.5 | 7 | No |
| 28 | 0.25 | 0.25 | 4 | Slight |

Composition C3

Composition C3 was formed as Composition C1 except that all of the polychloroprene latex was replaced by a SBR latex (Intex 168 sold by The International Synthetic Rubber Company Limited).

Comparative Tests L and M and Example 29 were carried out as in earlier experiments. The results are given in Table 10.

TABLE 10

| Experiment | POP % wt | SSF % wt | Gel time (minutes) | Exudation of water (sweating) |
|---|---|---|---|---|
| L | 0.5 | — | more than 75 | No |
| M | — | 0.5 | 10 | No |
| 29 | 0.25 | 0.25 | 7 | No |

I claim:

1. A process for the delayed action setting of a composition comprising an anionic latex of polychloroprene or a styrene-butadiene rubber by the addition of a delayed action setting agent characterized in that the setting agent is a mixture of (1) a compound containing a multivalent metal cation, which metal cation compound has a solubility in the range of 0.1 g to 150 g per 100 C of water at 20° C. and which has a dissolution time greater than one minute selected from the group consisting of aluminum acetate, barium nitrate, cupric sulfate, lead acetate, calcium sulphate, calcium sulfate dihydrate, calcium sulfate hemihydrate, ferrous sulfate, cupric acetate, magnesium acetate, and magnesium carbonate, and (2) and alkali metal silico fluoride.

* * * * *